United States Patent Office

3,373,201
Patented Mar. 12, 1968

3,373,201
CONTINUOUS PROCESS FOR THE PRODUCTION
OF CHOLINE CHLORIDE
Cyrille Van Eygen, Boitsfort, Belgium, assignor to UCB
(Union Chimique-Chemische Bedrijven) S.A.
No Drawing. Filed Oct. 23, 1965, Ser. No. 504,236
Claims priority, application Great Britain, Nov. 4, 1964,
44,989/64
11 Claims. (Cl. 260—567.6)

The present invention relates to a continuous process for the production of choline chloride.

Various syntheses of choline and of choline chloride are known. Certain processes, however, have only an academic interest, such as the reaction of a methyl halide with 2-dimethylamino-ethanol or the reaction of methyl formate with N,N-dimethyl-2-(ethoxymethoxy) - ethylamine, followed by heating the resulting quaternary salt with an alkanol and hydrochloric acid.

At present, the only method which permits the economical production of choline chloride consists in using trimethylamine, ethylene oxide and hydrochloric acid, which are readily available and relatively inexpensive, as raw materials. In this process, it is possible either to react the trimethylamine with ethylene oxide to obtain choline, which is then converted into choline chloride by the action of hydrochloric acid, or to react trimethylamine hydrochloride with ethylene oxide.

As far as is known, none of the above mentioned methods has, however, hitherto been carried out continuously. In the preparation of choline chloride from trimethylamine, hydrochloric acid and ethylene oxide, the continuous method offers considerable advantages over the batch process, namely:

(a) The suppression from each operation of the separate handling of the three reactants, one of which, ethylene oxide, forms explosive mixtures with air, thus requiring each time a purging of the apparatus with an inert gas;

(b) Easier maintenance of regular operating conditions;

(c) Greater productivity of the equipment for an equal capacity; and (d) A more constant quality of the resulting product.

Consequently it is an object of the present invention to provide a continuous process for the production of choline chloride in the liquid phase from trimethylamine hydrochloride and ethylene oxide.

The process which takes place may be illustrated by the following equation:

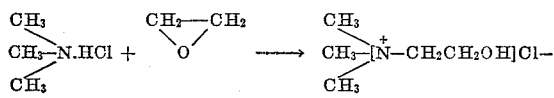

While apparently very simple, production of choline chloride is, nevertheless, very complicated when it is desired to carry it out continuously and if at the same time a product of alimentary quality is desired. Choline chloride being in fact, principally intended for the production of foodstuffs for cattle and poultry, must, therefore, not contain any constituents giving a bad taste or a bad odor to the foodstuffs and, in particular, must not contain toxic substances. In addition, an aqueous solution of choline chloride must have as little color as possible. In order that the continuous process may have optimum utility, as compared with the batch processes known at present, it is necessary that the choline chloride produced should have the required properties, from the point of view of odor, taste and coloration, without having to carry out subsequent purification treatments, which would increase manufacturing costs.

In fact, in order that choline chloride is free from disagreeable odor and taste of trimethylamine and/or its hydrochloride, it is necessary to carry out the reaction, illustrated by the above equation, with at least stoichiometric quantity, and preferably with a slight excess, of ethylene oxide.

I have found that by effecting the synthesis in the presence of excess ethylene oxide, the coloration obtained when the choline chloride is heated is the greater, the greater the excess of ethylene oxide, particularly in a heterogeneous system, for example, in the presence of a gaseous phase. I have also observed that the coloration increases with a rise in tempertaure.

In addition, ethylene chlorhydrin is also formed in the reaction medium by the reaction of ethylene oxide with hydrochloric acid. However, since ethylene chlorhydrin is toxic, the content of this compound in the choline chloride obtained must be as low as possible. It would, of course, be possible to lower the ethylene chlorhydrin content of the choline chloride obtained by carrying out a hot hydrolysis but, as explained above, the coloration of the final product increases with the rise in temperature. There is, therefore, an incompatability between obtaining, on the one hand, choline chloride which is not highly colored, and on the other hand, a choline chloride with a low ethylene chlorhydrin content. Moreover, substances of high molecular weight containing a polyoxyethylene chain may be formed by the addition of several moles of ethylene oxide to one mole of trimethylamine or water.

All the difficulties mentioned above are suppressed by the process according to the present invention which makes it possible to obtain, continuously a choline chloride of excellent alimentary quality, and with an excellent yield.

According to the process of the present invention, a stream of liquid ethylene oxide in excess and a stream of an aqueous solution of trimethylamine hydrochloride are introduced continuously, hot and under pressure, into a first reaction zone subjected to agitation and from which all gaseous phases are absent. The resulting liquid reaction mixture is then passed, hot and under pressure, through a second reaction zone which is substantially free from agitation and from which all gaseous phases are likewise absent. The reaction mixture leaving the second zone is passed to a concentration zone, in which part of the water and practically all the excess ethylene oxide are evaporated off, and the liquid reaction mixture is collected, which consists of an aqueous solution of choline chloride immediately ready for use.

The ethylene oxide used in the process of the present invention must have a good purity, for example of at least 99.5%; its aldehyde content may not be high, for example not higher than 0.1%.

The aqueous solution of trimethylamine hydrochloride is prepared in known manner, for example from aqueous hydrochloric acid and gaseous trimethylamine. However, when carrying out the present process, the aqueous solution of trimethylamine hydrochloride is preferably prepared from colorless hydrochloric acid, preferably having a hydrogen chloride content of 15 to 38% and an iron content not greater than 0.005% by weight, and from gaseous trimethylamine having a purity greater than 99%.

The first reaction zone, in which contact is made between the continuous stream of liquid ethylene oxide in excess and the continuous stream of an aqueous solution of trimethylamine hydrochloride, is preferably constituted by a vertical reactor provided with an agitation device effecting intimate contact between the reactants. In order to ensure the absence of a gaseous phase in this reactor, the reactant streams are admitted to the bottom portion of the reactor at different places and the outlet of the reaction mixture is situated at the highest point of the reactor. Since the reaction between ethylene oxide and trimethylamine hydrochloride is exothermic, the reactor must also be provided with a cooling system capable of maintaining the reaction mixture at a temperature from 60° to 120° C. and preferably between 60° and 80° C. The reactor is so designed as to be able to operate at a pressure of 5 to 20 atmospheres, preferably of 9 to 15 atmospheres. The reactant streams are preferably introduced by means of metering pumps. It is important for obtaining a quality product that the reactants should be supplied with great accuracy, so that there is always a slight excess of ethylene oxide (0.1 to 10%, preferably 1 to 2% by weight) referred to the stoichiometric proportion between the ethylene oxide and the trimethylamine hydrochloride. The reactor must have a capacity such that the retention time of the reactants therein is from 30 to 120 minutes, preferably from 45 to 90 minutes.

It is to be noted that at the outlet of the first reaction zone, the greater part of the raw materials has already reacted. Because of the absence of a gaseous phase in this zone and because the temperature has been kept at a sufficiently low value, the outflowing reaction mixture is practically colorless. However, it contains a fairly high proportion of ethylene chlorhydrin, of the order of 1 to 3% by weight.

In order, on the one hand, to complete the reaction and, on the other hand, to minimize or practically suppress the ethylene chlorhydrin in the reaction medium, the reaction mixture leaving the first reaction zone is admitted continuously into a second reaction zone which is also characterized by the absence of any gaseous phase. The essential difference between the first and second reaction zone is that, in this last-mentioned zone, care is taken to avoid disturbing the circulation of the reaction mixture. It is, in fact, necessary that the incoming solution, that is to say, the solution which has not yet completely reacted and which still contains ethylene oxide and trimethylamine hydrochloride, together with a considerable proportion of ethylene chlorhydrin, should not mix with the outgoing solution which has completely reacted and contains practically no ethylene chlorhydrin or trimethylamine hydrochloride.

The second zone is, for example, constituted by a tubular arrangement, immersed in a thermostatic vessel, in which the reaction medium circulates. The tubular arrangement is so disposed that the reaction mixture can travel a shorter or longer distance in this zone, that is to say, that it may remain therein for a shorter or longer time. The retention time will be the shorter, the higher the temperature in the second reaction zone, and vice versa, in order to minimize the coloration of the reaction mixture. In general, the temperature in the second reaction zone is at least 60° C., preferably at least 80° C., and at most 120° C., while the retention time does not exceed 40 minutes and is generally between 20 and 30 minutes, depending on the temperature used. The pressure in the second reaction zone is substantially the same as the first, namely, 5 to 20 atmospheres, preferably 9 to 15 atmospheres.

At the outlet of the second reaction zone, the reaction mixture is practically free of ethylene chlorhydrin and of trimethylamine hydrochloride but it must still be freed from excess ethylene oxide, on the one hand, and from a part of the water which it contains, on the other hand, so as to obtain a choline chloride solution having a negligible ethylene oxide content and the desired content of choline chloride, for example 50 to 70% by weight of choline chloride. For this purpose, the reaction mixture is passed continuously through an appropriate concentration apparatus, for example, a film evaporator, in which it is exposed to an elevated temperature for a very short time. The gaseous effluent of the concentration apparatus, which contains water vapor and a small quantity of ethylene oxide, is discharged and may be treated to recover the ethylene oxide. The liquid effluent of the concentration apparatus is an aqueous solution of choline chloride which is ready for immediate use and the concentration of which is adjusted to about 70% by controlling the evaporation temperature. This choline chloride solution is of a quality superior or equal to that of solutions prepared by previously known batch processes, as regards coloration, odor and taste.

The following example is given for the purpose of illustrating the process according to the present invention.

*Example*

The apparatus used comprises a first vertical cylindrical reactor having a capacity of 250 liters and divided internally by a coaxial, vertical cylindrical casting into an internal cylindrical chamber and an external annular chamber. These two chambers communicate with one another at the top and bottom through openings of large cross-section. Inside the chamber, there is mounted a turbine, which carries along the reaction mixture from bottom to top in the internal chamber and from top to bottom in the external annular chamber. The turbine produces a circulation of liquid of from 100 to 125 m.$^3$ per hour. This reactor is, in addition, provided with two metering pumps for supplying, at different levels in the annular external chamber, a stream of liquid ethylene oxide and a stream of aqueous trimethylamine hydrochloride solution, and with an external water trickle cooler, as well as with an internal helical water cooler. The reaction mixture leaves the reactor through a tubular outlet situated at the highest point of the reactor—in order to avoid the presence of a gaseous phase—and is passed to a second reactor.

The second reactor is constituted by a bundle of tubes having a capacity of 100 liters, immersed in a thermostatically controlled vessel to control the temperature of the reaction mixture circulating in this tubular apparatus. Each tube of the bundle is provided with a valve in order to enable it to be brought into or out of circuit, thus regulating the retention time of the mixture.

The outlet end of the second reactor is connected by a tube to a thin-layer evaporator using steam for concentrating. This apparatus is provided with two outlet apertures, one for the gaseous phase and the other for the liquid phase, i.e. the aqueous solution of choline chloride which is ready for use.

When the installation is set in operation, it is completely filled with an aqueous solution of choline chloride. 45 kg. of ethylene oxide (excess of 1–2%) and 181.5 kg. of an aqueous solution of trimethylamine hydrochloride having a pH of 5.5, prepared by reacting 122 kg. of pure aqueous 30% hydrochloric acid with 59.5 kg. of gaseous trimethylamine of more than 99% purity, are fed, per hour, into the first reactor. These reagents are introduced by means of two metering pumps working at a pressure of 12 to 13 kg./cm.$^2$. The temperature is maintained at 60° C. by cooling and the retention time of the mixture is about 70 minutes.

The effluent of the first reactor, which consists of an aqueous solution of choline chloride containing a certain amount of unreacted starting materials and of ethylene chlorhydrin, is continuously fed into the second reactor, which is kept at a temperature of 80° C. and a pressure of 12 kg./cm.$^2$. The retention time of the reaction mixture in the second reactor is about 20 minutes. The effluent of the second chamber is practically colorless solution of choline chloride containing a 1–2% excess of ethylene oxide, but containing practically no ethylene chlorhydrin or trimethylamine hydrochloride.

This solution is then passed continuously into the concentration apparatus in which the excess of ethylene oxide and about 25 kg. of water per hour are eliminated. A practically quantitative yield of 140 kg. per hour of choline chloride, in the form of a 70% aqueous solution, is obtained, the properties of which are given below:

Coloration: 25 APHA (determined according to ASTM D 1209–54).
    Density at 15° C.: 1.096.
    pH: 7.6
    Chlorine content: 17.52%.
    Nitrogen content: 6.93%.
    Ethylene chlorhydrin content: 0.02%.
    Ethylene oxide content: 0.004%.
    Trimethylamine hydrochloride content: 0.036%.
    Choline chloride content based on the nitrogen content: 69.05%.
    Choline chloride content based on the chlorine content: 69%.

I claim:

1. A continuous process for the production of an aqueous solution of choline chloride which comprises continuously introducing a stream of an aqueous solution of trimethylamine hydrochloride and a stream of liquid ethylene oxide in excess referred to the stoichiometric quantity, into a first reaction zone subjected to agitation, which is substantially free from gaseous phase and which is at a temperature of from at least 60° C. to at most 120° C. and at a pressure of 5 to 20 atmospheres, passing the resulting reaction mixture through a second reaction zone which is substantially free from agitation, which is substantially free from gaseous phase and which is at a temperature of from at least 60° C. to at most 120° C. and at a pressure of 5 to 20 atmospheres and finally passing the reaction mixture withdrawn from said second zone through a concentration zone wherein excess ethylene oxide is evaporated off and the reaction mixture is concentrated, thus obtaining an aqueous solution of choline chloride ready for use.

2. A process according to claim 1, wherein the ethylene oxide has a purity of at least 99.5% and contains not more than 0.1% of aldehyde.

3. A process according to claim 1, wherein the aqueous solution of trimethylamine hydrochloride is prepared from colorless hydrochloric acid, having a hydrogen chloride concentration of 15 to 38% by weight and containing not more than 0.005% by weight of iron, and from gaseous trimethylamine having a purity of more than 99%.

4. A process according to claim 1, wherein the excess of ethylene oxide is 0.1 to 10% by weight, referred to the stoichiometric quantity.

5. A process according to claim 1, wherein the excess of ethylene oxide is 1 to 2% by weight, referred to the stoichiometric quantity.

6. A process according to claim 1, wherein, in the first reaction zone, the temperature is between 60 and 80° C. and the pressure is between 9 and 15 atmospheres.

7. A process according to claim 1, wherein the retention time of the reaction mixture in the first reaction zone is from 30 to 120 minutes.

8. A process according to claim 1, wherein the retention time of the reaction mixture in the first reaction zone is from 45 to 90 minutes.

9. A process according to claim 1, wherein, in the second reaction zone, the temperature is at least 80° C. and the pressure is between 9 and 15 atmospheres.

10. A process according to claim 1, wherein the retention time of the reaction mixture in the second reaction zone does not exceed 40 minutes.

11. A process according to claim 1, wherein the retention time of the reaction mixture in the second reaction zone is between 20 and 30 minutes.

References Cited
UNITED STATES PATENTS

| | | | |
|---|---|---|---|
| 2,137,314 | 11/1938 | Ulrich et al. | 260—567.6 X |
| 2,774,759 | 12/1956 | Blackett et al. | 260—567.6 X |

CHARLES B. PARKER, *Primary Examiner.*

S. T. LAWRENCE III, *Assistant Examiner.*